(12) United States Patent
Araujo et al.

(10) Patent No.: US 11,128,562 B2
(45) Date of Patent: Sep. 21, 2021

(54) FAST REROUTE FOR CONNECTIONS OVER OUTBOUND PATHS

(71) Applicant: Fastly Inc., San Francisco, CA (US)

(72) Inventors: Joao Taveira Araujo, San Francisco, CA (US); Lennert Buytenhek, San Francisco, CA (US); Lorenzo Saino, San Francisco, CA (US); Raul Leonardo Landa Gamiochipi, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 150 days.

(21) Appl. No.: 16/572,838

(22) Filed: Sep. 17, 2019

(65) Prior Publication Data

US 2020/0120018 A1    Apr. 16, 2020

Related U.S. Application Data

(60) Provisional application No. 62/767,328, filed on Nov. 14, 2018, provisional application No. 62/732,667, filed on Sep. 18, 2018.

(51) Int. Cl.
| | | |
|---|---|---|
| *H04L 12/703* | (2013.01) | |
| *H04L 12/707* | (2013.01) | |
| *H04L 29/06* | (2006.01) | |
| *H04L 9/06* | (2006.01) | |
| *H04L 12/717* | (2013.01) | |
| *H04L 12/26* | (2006.01) | |
| *H04L 12/801* | (2013.01) | |

(52) U.S. Cl.
CPC ............ *H04L 45/28* (2013.01); *H04L 9/0643* (2013.01); *H04L 45/22* (2013.01); *H04L 45/24* (2013.01); *H04L 45/42* (2013.01); *H04L 63/02* (2013.01); *H04L 63/166* (2013.01); *H04L 43/0823* (2013.01); *H04L 47/12* (2013.01)

(58) Field of Classification Search
None
See application file for complete search history.

(56) References Cited

U.S. PATENT DOCUMENTS

| | | |
|---|---|---|
| 2011/0026403 A1 | 2/2011 | Shao et al. |
| 2011/0142051 A1 | 6/2011 | Bhatt et al. |
| 2015/0237013 A1 | 8/2015 | Baansal et al. |
| 2016/0294681 A1 * | 10/2016 | Khakpour ............. H04L 45/306 |
| 2020/0162388 A1 * | 5/2020 | Lam ........................ H04L 45/04 |

* cited by examiner

*Primary Examiner* — Jutai Kao

(57) ABSTRACT

A server detects a failure of an outbound path based on at least a measure of forward progress made on a connection between the server and an end point. In response to the failure, the server generates a hash value based at least on an identifying value of the connection and a failure counter associated with the measure of forward progress made on the connection. The server then selects a next outbound path for the packet flow based on at least the hash value generated in response to the failure. The server also sends the packet flow over the next outbound path to the end point.

20 Claims, 12 Drawing Sheets

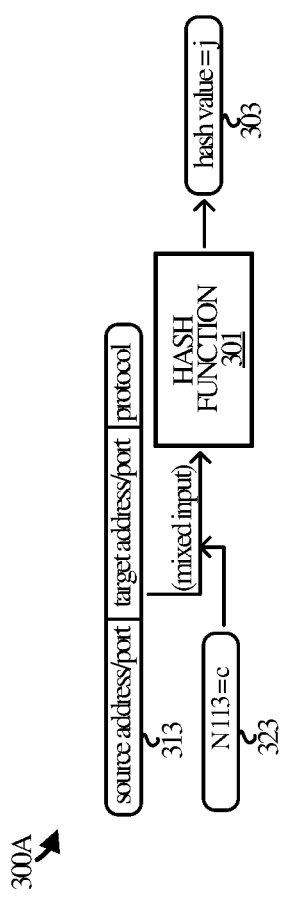
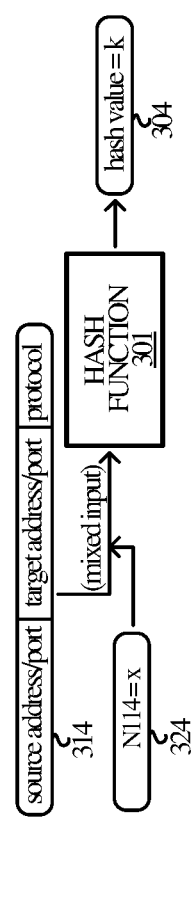
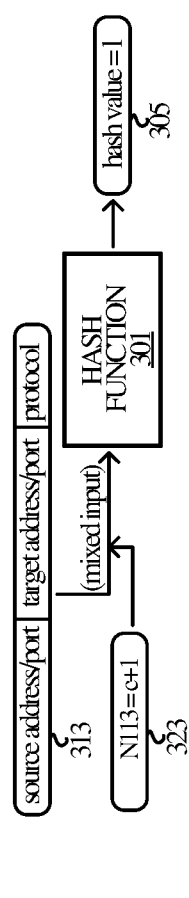
FIGURE 3A
FIGURE 3B
FIGURE 3C

FAST REROUTE FOR CONNECTIONS OVER OUTBOUND PATHS

RELATED APPLICATIONS

This application is related to, and claims the benefit of prior to, U.S. Provisional Patent Application No. 62/732,667, entitled "Fast Reroute for Connections Over Outbound Paths," and filed on Sep. 18, 2018, as well as to U.S. Provisional Patent Application No. 62/767,328, also entitled "Fast Reroute for Connections Over Outbound Paths," and filed on Nov. 14, 2018, both of which are hereby incorporated by reference in their entirety.

TECHNICAL FIELD

Aspects of the disclosure are related to the field of computing and communication infrastructure technology and, more particularly, to managing packet flows over networks.

BACKGROUND

Content delivery networks, edge cloud platforms, and other types of infrastructure services send and receive huge volumes of data. The data is typically sent and received between servers and end points over logical connections that are created and torn down dynamically as needed to handle packet flows over the connections. The servers and end points establish the connections with each other, typically in accordance with one or more of a variety of protocols, such as the Transport Control Protocol (TCP).

The connections that are created to handle packet flows traverse outbound paths from the servers to the end points and inbound paths from the end points to the servers. TCP and other transport layer protocols like it provide for reliable connectivity over a given path between a server and an end point. For example, TCP provides for data to be retransmitted from one end to another in the event that an earlier attempt to send the data was not acknowledged. However, such retransmissions may not be effective if the cause of a failure is with the inbound or outbound path over which the data has been sent. That is, no amount of retransmitting will be successful if the path between a server and an end point has failed somewhere along the way.

The border gateway protocol (BGP) is a protocol designed to, among other things, address the problem of path failures. BGP is used to exchange routing and reachability information among routing systems on the Internet, thus allowing such systems to react to a path failure by rerouting packet flows over other paths.

Unfortunately, BGP is error prone due to its reliance on timeouts to detect path failures. Even when BGP detects a path failure, routers are known to continue to send traffic to each other regardless. The end result is that, by the time a packet flow can be rerouted in response to a path failure detected by BGP, a great deal of traffic may have been lost. Such problems may be compounded by retransmission attempts that add traffic to the network, even though an outbound path the traffic would traverse has been compromised.

OVERVIEW

Technology is disclosed herein for rerouting packet flows over outbound paths in response to path failures detected at the connection layer. In an implementation, an edge service detects a failure of an outbound path based on at least a measure of forward progress made on a connection between the server and an end point. In response to the failure, the edge service generates a hash value based at least on an identifying value of the connection and a failure counter associated with the measure of forward progress made on the connection. The edge service then selects a next outbound path for the packet flow based on at least the hash value generated in response to the failure. The edge service also sends the packet flow over the next outbound path to the end point.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 3A-3C illustrate the operation of a hash function in an implementation.

DETAILED DESCRIPTION

Figure 1:
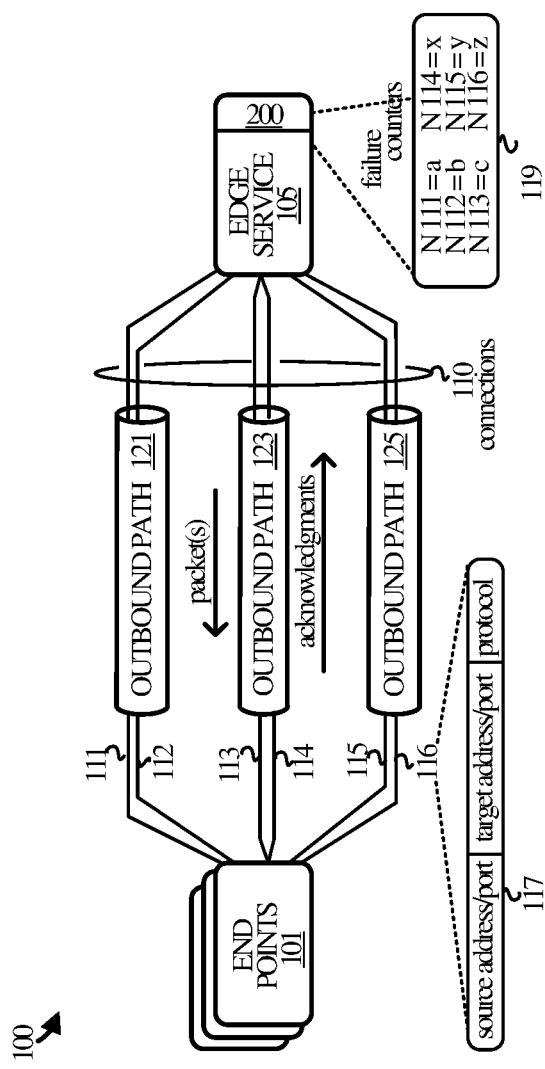
FIG. 1 illustrates an operational environment in an implementation.

Technology disclosed herein relates to solutions for rerouting packet flows over paths outbound from infrastructure services such as content delivery networks, cloud edge platforms, and other computing and communications environments.

In various implementations, a reroute process may be employed by any one or more of the servers, routers, and other elements in an infrastructure service to monitor the forward progress made on a connection from the infrastructure service to an end point. When a path failure is detected, as determined by a measure of the forward progress, a hash value is generated based on an identifying value of the connection and a failure counter associated with the measure of forward progress. The hash value is then used to select a next outbound path for the connection and the packet flow can be rerouted over the selected path accordingly.

To produce the hash value, an input to a hash function is generated from the identifying value and the failure counter. In some implementations, the identifying value is one of a set of identifying values in a tuple associated with the connection such as, but not limited to, a protocol identifier, a source Internet protocol (IP) address, a source port, a target IP address, and a target port. The failure counter may be mixed with the tuple such as by replacing one of the values with the failure counter, adding the failure counter to the tuple, performing an exclusive-or operation on one or more of the values and the failure counter, or the like.

In some cases, the failure counter itself may be encoded in a firewall marker property of a socket on the connection being rerouted. This may be accomplished by, for example, encoding the failure counter in the four upper bits of a firewall marker (fwmark). The value of the firewall marker may be used in some implementations to determine which routing table to use when selecting a route. A zero-value firewall marker may correspond to one routing table, for instance, while a non-zero value may correspond to a different routing table, thereby influencing the selection of the new outbound path.

In some implementations, detecting the failure of the outbound path occurs when the measure of forward progress made on the connection indicates an absence of any forward progress for an amount of time. This may be accomplished by, for example, monitoring for acknowledgments on the connection from the end point. An absence of forward progress may be declared when no acknowledgments are received for an amount of time, after which the failure counter may be incremented.

The outbound path from the infrastructure service to the end point may traverse two or more networks. The detected failure may thus be caused by one or more of the networks along the outbound path. The next outbound path may traverse at least one network not traversed by the outbound path, allowing the packet flow to avoid the detected failure.

In some implementations, an outbound path may have failed before a connection between an end point and a server can even be established. In such instances, fast rerouting may be invoked when a certain number of attempts to establish a connection have occurred. For instance, a request to establish a connection may be received in a server from an end point, in response to which the server sends a reply message. However, the reply message may not reach the end point if the outbound path is blocked. The server may thus trigger a reroute after a certain number of attempts to communicate the reply message.

A technical effect may thus be appreciated that packet flows may be quickly rerouted from one outbound path to another, thereby mitigating some of the drawbacks of relying upon BGP such as lost packets, excessive retransmissions, and other errors. For example, the speed with which a packet flow may be rerouted using the techniques described herein may be greater than that which is typically accomplished when relying upon BGP. Such speed may be made possible by monitoring the forward progress of a connection (e.g. a transmission control protocol— or TCP— connection) and triggering a reroute to a new outbound path in response to a detected failure as indicated by the measured forward progress.

Another technical effect is the ability to distribute packet flows to one or more other outbound routes so as not to overload any particular outbound route. This is accomplished by incrementing the failure counter associated with a connection and mixing the failure counter with the tuple that is used to produce a hash value. Since the hash value is then used to pick a route, and since hash functions are deterministic, incrementing the failure counter results in different hash values, even if the connection values remain the same. Thus, since different hash values may correspond to different routes in the routing table(s), incrementing the failure counter may result in the selection of different routes (or outbound paths). Such a technique reduces the likelihood of rerouting the packet flows destined for a particular end point to the same outbound path each time a reroute is triggered.

Referring now to the drawings, FIG. 1 illustrates operational environment 100 in an implementation. End points 101 and edge service 105 establish logical connections with each other, through which content may be requested and sent, of which connections 111, 112, 113, 114, 115, and 116 are representative. Edge service transmits the content over one or more outbound paths to a given end point, of which outbound paths 121, 123, and 125 are representative.

End points 101 are representative of the various computing devices from which requests for content may originate and to which content may be served, such as consumer devices, enterprise devices, and the like. Examples include, but are not limited to, laptop and desktop computers, tablets, mobile phones, wearable devices, entertainment devices, gaming devices, other server computers, Internet of Things (IoT) devices, or any other type of end point device. End points 101 communicate with edge service 105 over one or more public or private communication networks (e.g. the Internet), combination of networks, or variations thereof.

Figure 9:
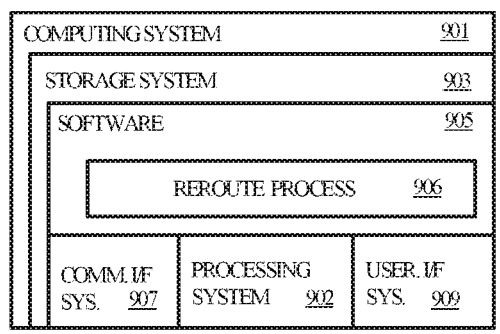
FIG. 9 illustrates a computing system suitable for implementing the various operational environments, architectures, processes, scenarios, and sequences discussed below with respect to the Figures.

Edge service 105 is representative of a content delivery network, an edge cloud platform, or the like, and is comprised of various physical and/or virtual computing and communication elements suitable for implementing a variety of associated infrastructure services, of which computing system 901 in FIG. 9 is representative. For example, edge service 105 may include routers, servers, and other elements that function together to serve content to end points 101. Edge service 105 may in some implementations obtain the content from origin servers (not shown) and cache the content on its servers for faster serving to end points. Examples of content that may be served to end points include text, images, video, web pages, objects, applications, or any other type of data.

Connections 110 are representative of the transport layer connections that end points 101 may make with edge service 105 to facilitate the exchange of data. Connections 110 may be established in accordance with a variety of communication protocols such as the transmission control protocol (TCP), the stream control transmission protocol (SCTP), quick user datagram Internet connections (QUIC), and other connection-oriented protocols.

Outbound paths 121, 123, and 125 are representative of the various paths traffic may take in an outbound direction from edge service 105 to end points 101. Traffic sent from end points 101 to edge service 105 may travel the same or different paths, but in the inbound direction from the perspective of edge service 105. Outbound paths 121, 123, and 125 may each traverse one or more networks that connect edge service 105 to end points 101, examples of which include (but are not limited to) transit networks, peering networks, backbone networks, Internet service provider (ISP) networks, local ISPs, and any other type of network, combination of networks, or variation thereof.

Edge service 105 transmits various packet flows within the context of logical connections, represented by connections 111, 112, 113, 114, 115, and 116. The packets of each packet flow traverse a given outbound path selected for the flow when sent by edge service 105 to a destination. Thus, a given connection may also be considered to traverse a given outbound path. For exemplary purposes, FIG. 1 illustrates that connections 111 and 112 traverse outbound path 121; connections 113 and 114 traverse outbound path 123; and connections 115 and 116 traverse outbound path 125. In the inbound direction, the packets may traverse the same or a different path as they took in the outbound direction.

Each connection may be described in terms of a tuple formed by one or more identifying values of the connection. Examples of identifying values of a connection include, but are not limited to its source address, source port, target address, target port, and protocol. Tuple 117 is given as an example of identifying values for connection 116. Edge service 105 may utilize said tuples to calculate hash values, which may then be used to navigate one or more routing tables that define which route (or outbound path) to use for a given transmission. As the routes may fail or otherwise underperform from time to time, edge service 105 employs a reroute process 200 for rerouting connections in response to failures or other performance issues.

Figure 2:
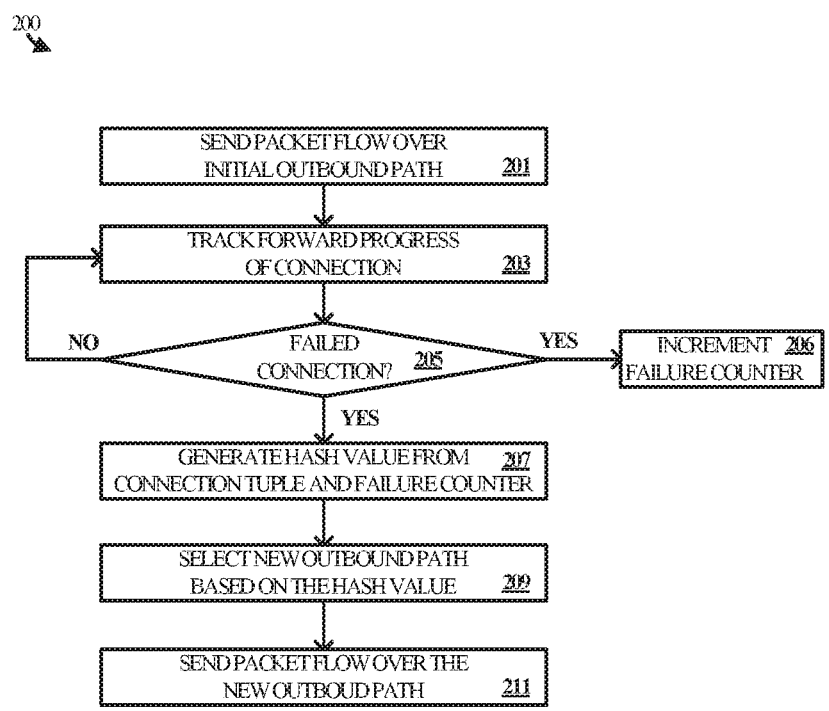
FIG. 2 illustrates a reroute process in an implementation.

Referring to FIG. 2, reroute process 200 may be implemented in program instructions in the context of any of the software applications, modules, components, or other such programming elements deployed in the various elements of edge service 105, such as routers and servers. The program instructions direct the underlying physical or virtual computing system or systems to operate as follows, referring parenthetically to the steps in FIG. 2 in the context of operational environment 100 in FIG. 1.

To begin, edge service 105 sends a packet flow over an initial outbound path (step 201). The packet flow may comprise packets that carry the content requested by an end point. The end point (or edge service 105) establishes a connection via which the packets may be transmitted, e.g. a TCP connection or the like.

Next, edge service 105 tracks the forward progress of the connection while sending (or attempting to send) packets to the end point (step 203). As packets are sent from edge service 105 to the end point, the end point replies with acknowledgement messages (ACKs) in accordance with the connection protocol implemented between the end point and edge service 105. Edge service 105 tracks the forward progress of the connection by, for example, monitoring for ACKs from the end point, and determines whether the path has failed based on the monitored forward progress of the connection (step 205). Monitoring for ACKs may include determining whether an ACK has been received for a certain amount of time. If no ACK is received during the amount of time, then a failure may be declared. The amount of time may be a global value or a non-global value. In the case of a non-global value, the timeout period may depend on the round-trip time (RTT) of the connection. That is, the timeout period may vary on a per-connection basis, based on the RTT for a given connection.

In an alternative to declaring failures based on the absence of an ACK, a path may be considered to have failed upon a retransmit timeout for a connection occurring. A failure could also be declared in response to a retransmit of a segment occurring after more than a certain amount of time since it was previously transmitted. In still another alternative, a failure could be declared in response to a retransmit of a segment occurring after more than a certain amount of time has elapsed since a connection entered a retransmit mode.

In some implementations, an outbound path may have failed before a connection between an end point and a server can even be established. In such instances, the outbound path may be considered to have failed when the number of SYN-ACK retransmissions meets or exceeds a threshold.

If the path has not failed, then edge service 105 continues to monitor the forward progress of the connection. However, if the path has failed, edge service 105 increments a failure counter associated with the connection (step 206). Failure counters 119 in FIG. 1 are representative of the failure counters that edge service 105 may maintain for each connection. Failure counters 119 include: counter Niii corresponding to connection 111; counter $N_{112}$ corresponding to connection 112; counter $N_{113}$ corresponding to connection 113; counter $N_{114}$ corresponding to connection 114; counter $N_{115}$ corresponding to connection 115; and counter $N_{116}$ corresponding to connection 116.

Having incremented the failure counter, edge service 105 proceeds to generate a hash value from the incremented failure counter and the tuple associated with the connection (step 207). This may involve, for example, mixing the failure counter with the tuple. Mixing the failure counter with the tuple may include replacing one or more of the tuple values with the failure counter, encoding the failure counter in one or more of the tuple values, adding the failure counter to the tuple, or otherwise modifying the tuple to include the value of the failure counter.

Since the path has failed or is otherwise underperforming, edge service 105 determines to move the packet flow to a new outbound path, so as to avoid whatever problem along the initial outbound path may be causing the path failure. Edge service 105 selects the new outbound path based on the generated hash value (step 209). The hash value may be used to select a specific route from a routing table. In some implementations, the hash value is also used to select the routing table from a set of routing tables.

Edge service 105 then reroutes (sends) the packet flow over the new outbound path (step 211). At the same time, other connections that also entered into a failed state may also be rerouted by edge service to the same or other outbound paths. However, the failure condition that triggered the rerouting may eventually abate. Therefore, it may be desired to eventually return (or reroute) all of the rerouted connections to their original outbound paths. If so desired, this step could be performed after a period of time, after the original outbound path has been checked, or in response to some other suitable condition having been met. For instance, a given connection could be returned to the original outbound path and, if successful, then other connections could also be returned to the original outbound path.

FIGS. 3A-3C briefly illustrate the operation of a hash function 301 as applied in three different scenarios. It is assumed for exemplary purposes that $c \neq x$, $j \neq k$, $k \neq l$, and $l \neq j$.

In scenario 300A, tuple 313 for one connection is mixed with the failure counter 323 for that connection. Mixed input is supplied to hash function 301, which produces hash value 303 ("j"). In scenario 300B, tuple 314 for a different connection is mixed with the failure counter 324 for that connection. The mixed input is supplied to hash function 303, which produces value 304 ("k"). However, in scenario 300C, tuple 313 is again mixed with failure counter 323. The mixed input produces hash value 305 ("l").

It may be appreciated from the foregoing scenarios that mixing the failure counters into the tuples decreases the likelihood that all of the packet flows are rerouted to the same new outbound path. That is, mixing the failure counter into the tuple increases the likelihood that the rerouted packet flows are well-distributed over multiple outbound paths, so as to avoid burying a given outbound path by rerouting the packet flows to it. This is because, the greater the difference between the hash inputs, the greater the likelihood that hash values will differ. The difference between the hash inputs is increased by mixing in the different failure counters. In fact, in some implementations, the hash function may exhibit an avalanche effect such that only a small change to the hash input (e.g. changing 1 bit) results in a large change to the hash output (e.g. 50% of the bits), thereby ensuring that a single outbound path is not overwhelmed.

In an alternative to mixing the failure counter into the hash input, a random value could be added to the output of the hash function upon an initial path failure. Then, the hash output could be incremented upon the detection of every subsequent path failure.

Figure 4A:
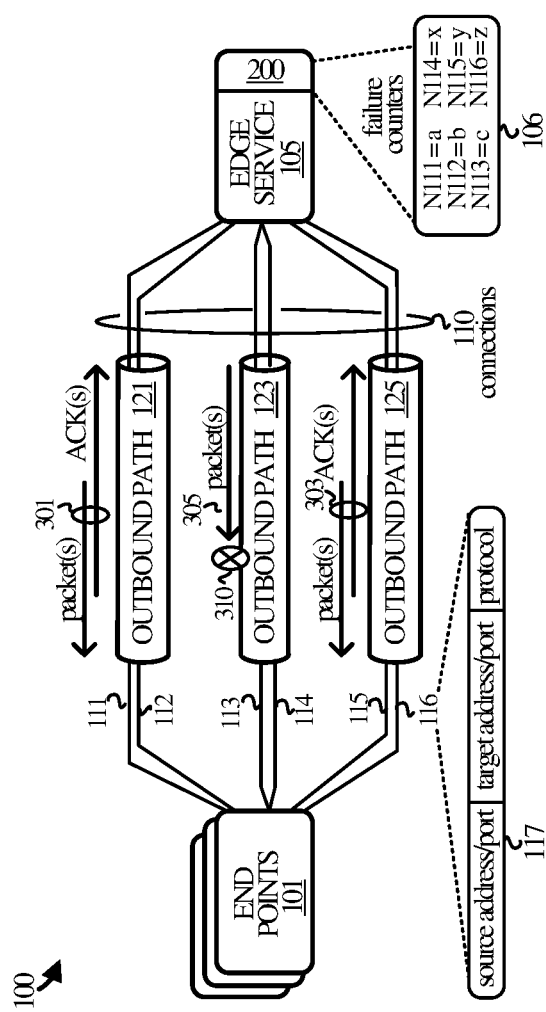
FIGS. 4A-4B illustrate an operational scenario in an implementation.
Figure 4B:
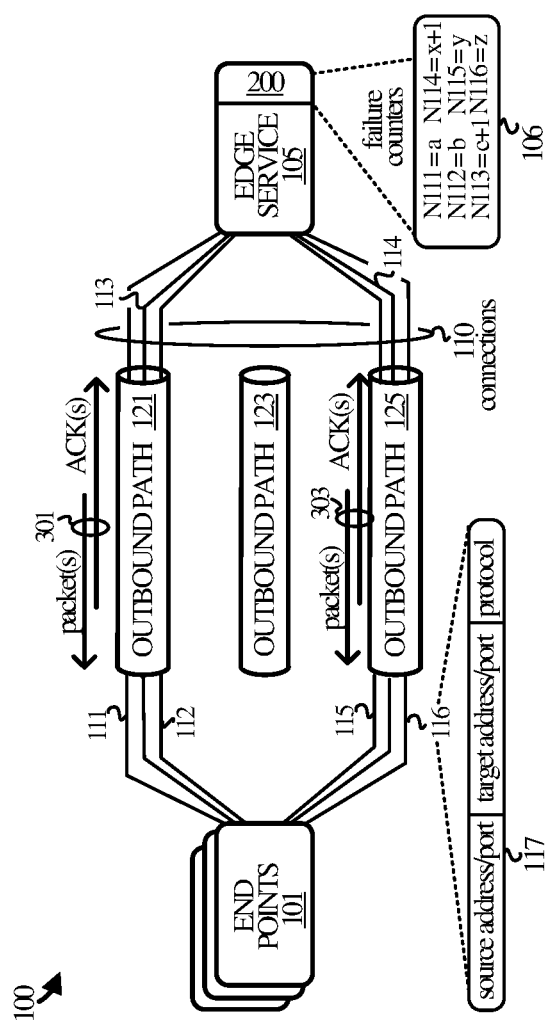

FIGS. 4A-4B illustrate another operational scenario to further demonstrate the technical effects produced by reroute process 200 as employed by edge service 105 in operational environment 100. Referring to FIG. 4A, end points 101 establish connections 110 with edge service 105 to obtain content such as web pages, video, images, text, objects, applications, and the like. The end points 101 communicate individual requests for the content over the connections. Edge service 105 receives the requests and attempts to reply with the content. In some implementations, edge service 105 may obtain the content from an origin server or elsewhere if it does not already have the content at its disposal.

Edge service 105 transmits the content in the form of packets. The packets make up a packet flow from edge service 105 to a specific one of end points 101. A given set of packets (or packet flow) sent in the outbound direction within the context a connection established between the edge service 105 and the end point traverses one of outbound paths 121, 123, and 125. When the end point receives a packet, it replies with an acknowledgement message to signal to edge service 105 that the packet was received and need not be retransmitted. Such traffic in-bound to edge service 105 may traverse the same or a different path as the packets sent in the outbound direction.

In this example scenario, traffic 301 is exchanged in the outbound direction between edge service 105 and one or more of end points 101 via connection 111 and 112 over outbound path 121. Acknowledgments and other inbound traffic may traverse the same or a different path. Similarly, traffic 303 is exchanged in the outbound direction between edge service 105 and one or more of end points 101 via connection 115 and 116 over outbound path 125. Acknowledgments and other inbound traffic may traverse the same or a different path. However, in an attempt to send traffic 305 (packets) to one or more of end points 101, a failure 310 blocks the packets from being received. Accordingly, no corresponding acknowledgements reach edge service 105 (as perhaps none have been sent).

Edge service 105, employing reroute process 200, detects the absence of forward progress on both connections, connection 113 and connection 114. Edge service 105 increments their respective failure counters $N_{113}$ and $N_{114}$ to c+1 and x+1 respectively. The incremented failure counters are mixed with the tuple for each respective connection and input into a hash function. The hash function calculates a hash value from the mixed input. Edge service 105 then uses the hash value to select a new outbound route for the packet flows associated with the "failed" connections.

FIG. 4B illustrates an exemplary result of the fast reroute. Connection 113 has been rerouted to outbound path 121, while connection 114 has been rerouted to outbound path 125. Traffic 301 now includes packets and possibly acknowledgements flowing via connection 113, while traffic 303 includes packets and acknowledgements flowing via connection 114. In addition, the failure counters have been incremented and may remain so, at least for a period of time, to promote path diversity with respect to traffic rerouting. It may be appreciated that the inbound acknowledgements may take the same or a different path as the outbound packets.

Figure 5:
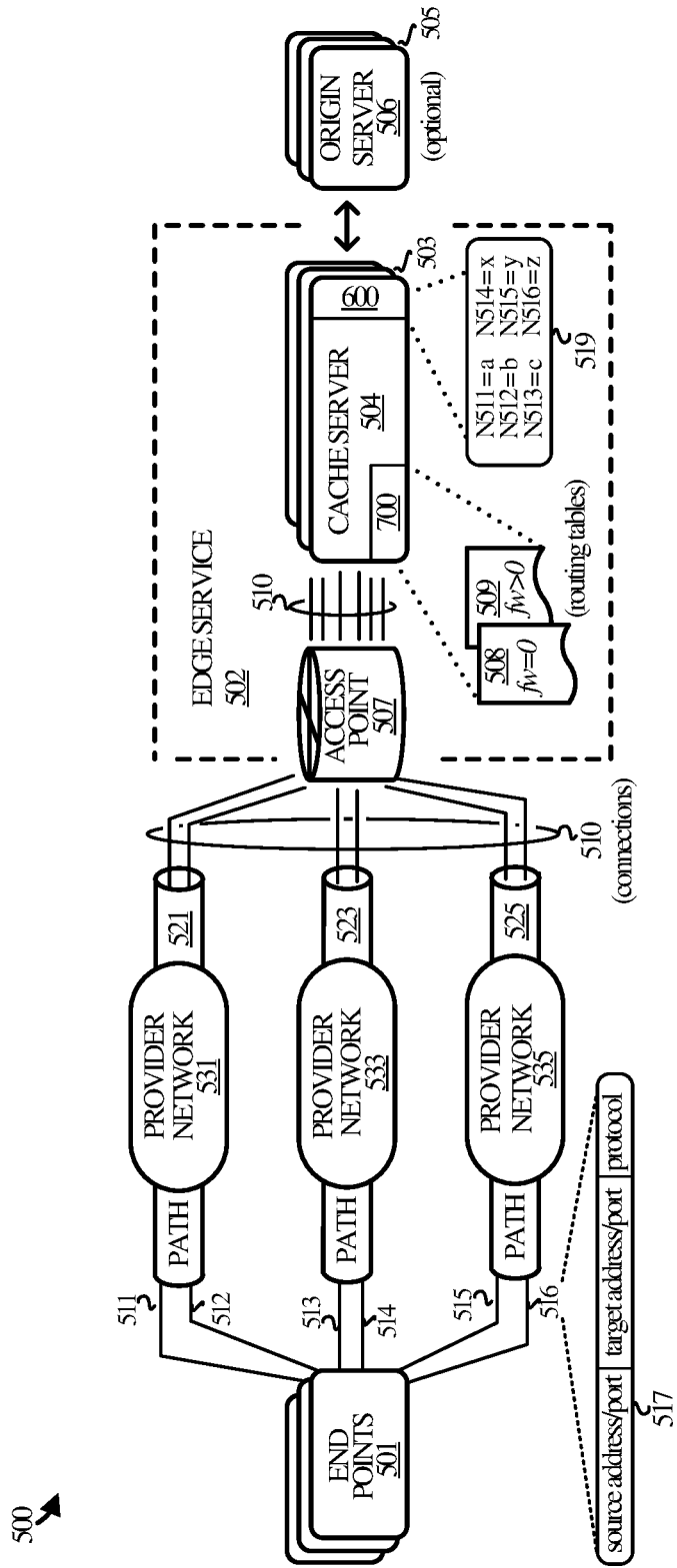
FIG. 5 illustrates an operational environment in an implementation.

FIG. 5 illustrates operational environment 500 in an implementation. Operational environment 501 includes end points 501, edge service 502, and origin servers 505 (optional). Edge service 502 includes cache servers 503, of which cache server 504 is representative, as well as access point 507. Cache server 504 includes routing tables 508 and 509, in addition to counter table 519.

End points 501 communicate with edge service 502 via one or more provider networks, represented for the sake of simplicity by provider network 531, provider network 533, and provider network 535. It may be appreciated that one or more other provider networks may connect provider networks 531, 533, and 535 to end points 501.

In operation, end points 501 establish connections 510 with cache servers 503 in edge service 502 in accordance with a suitable connection-oriented protocol, such as TCP, RTP, QUIC, and the like. The end points request content from the cache servers 503 and the cache servers reply with the content. In instances where a given server does not have the content, the server obtains the content from one or more of origin servers 505 or from another cache server.

Cache servers 503 transmit the content to end points 501 via one or more of paths 521, 523, 525. Paths 521, 523, and 525 are representative the various paths traffic may take in an outbound direction from access point 507 to end points 501. Traffic sent from end points 501 to access point 507 may travel the same or different paths, but in the inbound direction from the perspective of edge service 502. Paths 521, 523, and 525 each traverse one or more networks that connect edge service 502 to end points 501, of which provider networks 531, 533, and 535 are representative. Examples of provider networks 531, 533, and 535 include (but are not limited to) transit networks, peering networks, backbone networks, Internet service provider (ISP) networks, local ISPs, and any other type of network, combination, or variation thereof. Examples of access point 507 include, but are not limited to, physical or virtual switches, physical or virtual routers, or any combination or variation thereof.

Cache servers 503 transmit their various packet flows within the context of the logical connections made with end points 501, represented by connections 511, 512, 513, 514, 515, and 516. The packets of each packet flow traverse a given outbound path selected for the flow. Thus, a given connection may also be considered to traverse a given outbound path. For exemplary purposes, FIG. 5 illustrates that connections 511 and 512 traverse path 521 in the outbound direction; connections 513 and 514 traverse path 523 in the outbound direction; and connections 515 and 516 traverse path 525 in the outbound direction. Traffic flowing in the inbound direction may take the same or different path as the outbound traffic.

Each connection may be described in terms of a tuple formed by one or more identifying values of the connection. Examples of identifying values of a connection include—but are not limited—to its source address, source port, target address, target port, and protocol. Tuple 517 is given as an example of identifying values for connection 516. Cache servers 503 may utilize said tuples to calculate hash values, which may then be used to navigate one or more routing tables that define which route (or outbound path) to use for a given transmission. As the routes may fail or otherwise underperform from time to time, the cache servers 503 employ a reroute process 600 for rerouting traffic in response to failures or other performance issues. In addition, cache servers 503 employ a reroute process 700. Reroute process 600 is described in more detail in FIG. 6, while reroute process 700 is illustrated in FIG. 7.

Reroute process 600 and reroute process 700 may each be implemented in program instructions in the context of any of the software applications, modules, components, or other such programming elements of cache servers 503. The program instructions direct the underlying physical or virtual computing system or systems (of which computing system 901 is representative) to operate as follows, referring parenthetically to the steps in FIG. 6 and FIG. 7 in the context of operational environment 500 in FIG. 5 and with respect to cache server 504.

Figure 6:
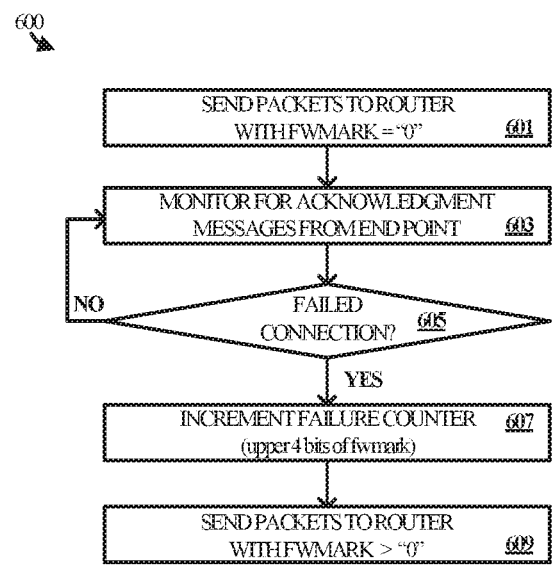
FIG. 6 illustrates a reroute process employed by a server in an implementation.
Figure 7:
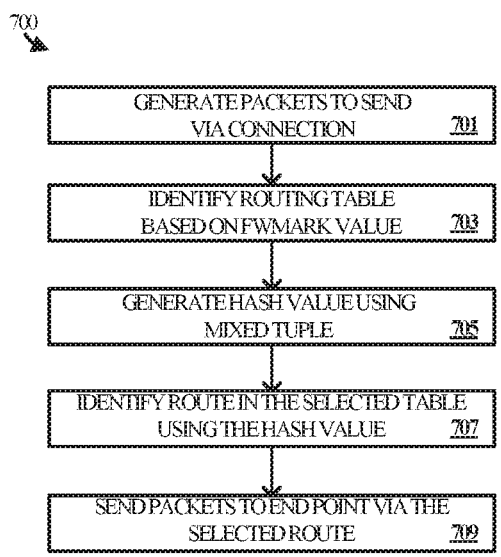
FIG. 7 illustrates a reroute process employed by a router in an implementation.

Referring to FIG. 6, cache server 504 sets a firewall marker (fwmark) to "0" on the socket used for a connection, via which the cache server sends the packets in a flow (step 601). Setting the firewall marker to zero indicates to reroute process 700 in the cache server that a main or base routing table should be used to select a route for a packet.

The packets are sent by access point 507 to an end point. If the end point receives the packets, it replies with acknowledgments. If not, then no acknowledgments are forthcoming. Cache server 504 therefore monitors for the end point associated with a connection to return an acknowledgment (step 603) and makes a determination, based on the forward progress on the connection, whether the path has failed (step 605). An absence of forward progress would be indicated by a lack of any acknowledgment message.

If the path has not failed, then cache server 504 continues to monitor the forward progress of packets being sent on the connection to the end point. However, if the path has failed, then cache serer 504 increments a failure counter associated with the connection (step 607). In this implementation, the failure counter is represented in the upper 4 bits of the firewall marker value.

Failure counters 519 in FIG. 5 are representative of the failure counters that cache server 504 may maintain for each connection that it makes with an end point. Failure counters 519 include: counter $N_{511}$ corresponding to connection 511; counter $N_{512}$ corresponding to connection 512; counter $N_{513}$ corresponding to connection 513; counter $N_{514}$ corresponding to connection 514; counter $N_{515}$ corresponding to connection 515; and counter $N_{516}$ corresponding to connection 516.

Having incremented the failure counter for the connection, cache server 504 continues to process and send packets to access point 507 in the context of the same connection, but with the firewall marker for the connection set to a value greater than zero (step 609). The process repeats for the remaining packets in the flow or until some other event causes the process to cease.

Referring to reroute process 700 in FIG. 7, cache server 504 generates the packets to send over a connection to an end-point (step 701) and identifies which routing table to use based on the value of the firewall marker identified on the socket for the connection (step 703). If the firewall value is zero, then cache server 504 utilizes table 508. However, if the firewall value is greater than zero, then cache server 504 uses table 509. It may be assumed for exemplary purposes that the base table (table 508) contains fewer routes than table 509. Thus, a non-zero value for the firewall marker results in a greater selection of potential routes for a given packet.

Next, cache server 504 generates a hash value using a mixed tuple produced from the failure counter and the tuple for a subject connection (step 705). For instance, cache server 504 may mix the failure counter with the tuple. Mixing the failure counter with the tuple may include replacing one or more of the tuple values with the failure counter, encoding the failure counter in one or more of the tuple values, adding the failure counter to the tuple, or otherwise modifying the tuple to include the value of the failure counter.

The mixed input is supplied to a hash function implemented by cache server 504 to generate the hash value. The hash function is used to map input values to possible output values. The output values (hash values) may then be used to lookup a particular outbound path or route for a packet.

Cache server 504 enters table 508 with the hash value to select the appropriate route for the packet (step 707). Table 508 stores a list of routes in association with hash values, hash ranges, or other such indications. As such, the resulting hash value is used to look-up or otherwise identify the corresponding route (outbound path). Cache server 504 then sends the packet addressed to the end point via the identified route (step 709). This may include, for example, sending the packet to access point 507 with the identified route indicated in the packet, in data that encapsulates the packet, or by some other mechanism. In some implementations, each route is identified by a different multi-protocol label switching (MPLS) label.

Cache server 504 continues to generate and process incoming packets in this manner. Thus, as the firewall marker is incremented, the resulting hash value may change. The change in hash value may drive a change in outbound routes. In this manner, packet flows may be rerouted, but without over-burdening any given route.

Figure 8A:
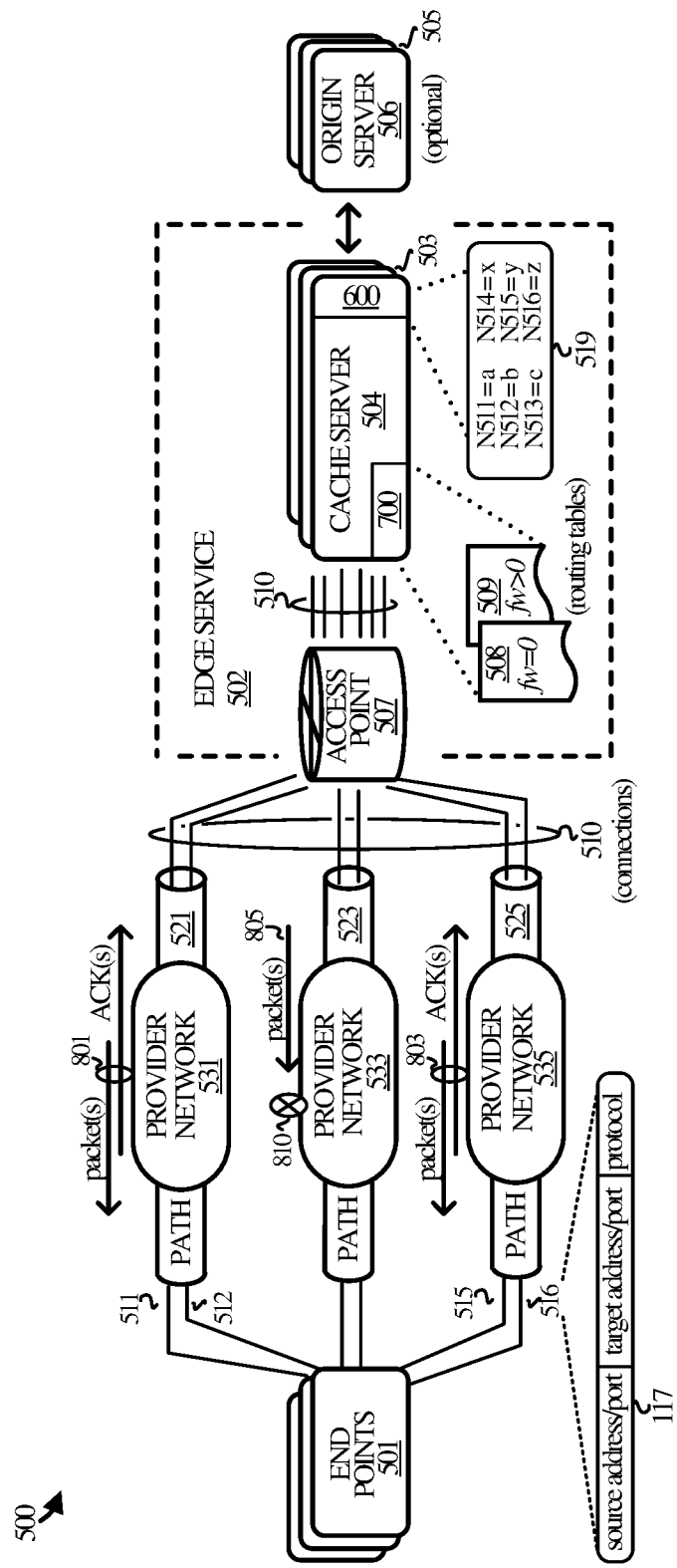
FIGS. 8A-8C illustrate an operational scenario in an implementation.
Figure 8B:
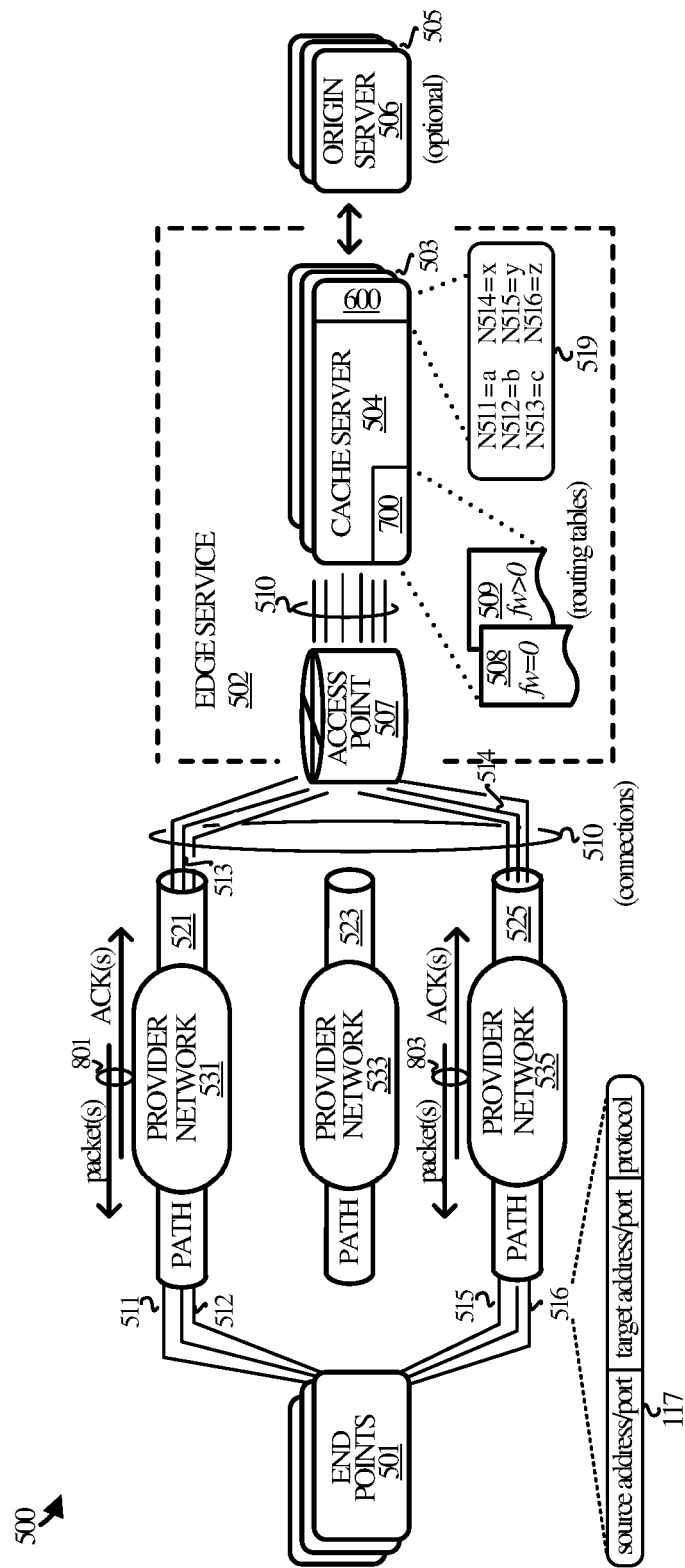
Figure 8C:
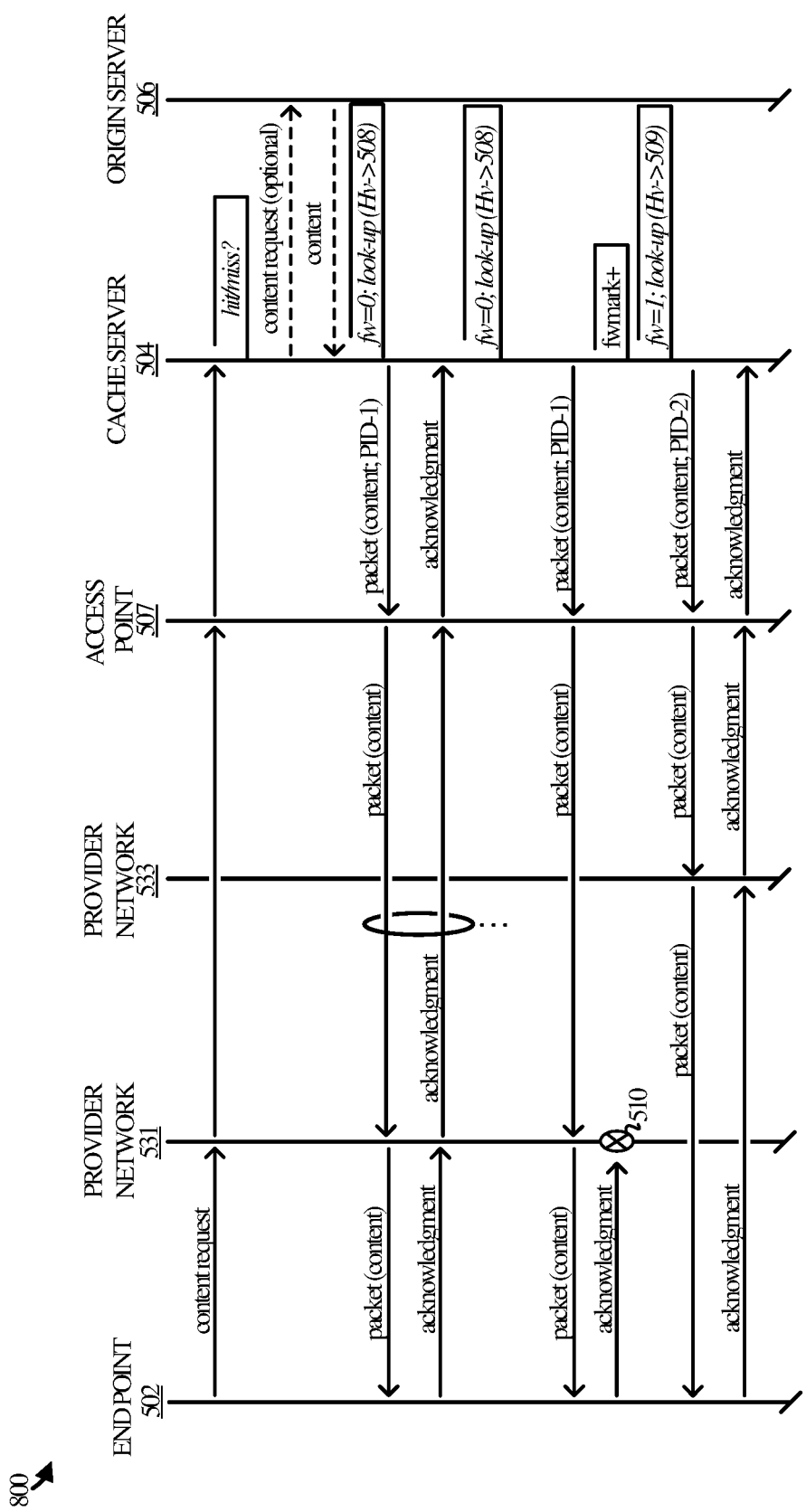

FIGS. 8A-8C illustrate another operational scenario to further demonstrate the technical effects produced by reroute process 600 and reroute process 700. Referring to FIG. 8A, end points 501 establish connections 510 with edge service 502 to obtain content such as web pages, video, images, text, objects, applications, and the like. The end points 501 communicate individual requests for the content over the connections. Cache server 504 receives the requests and attempts to reply with the content. In some implementations, cache server 504 may obtain the content from origin server 506 or elsewhere if it does not already have the content at its disposal.

Cache server 504 sends the packets to access point 507 to send in the form of packets to the end points. The packets make of a packet flow from edge service 502 to a specific one of end points 501. A given set of packets (or packet flow) sent within the context a connection established between the edge service 502 and the end point traverses one of paths 521, 523, and 525. When the end point receives a packet, it replies with an acknowledgement message to signal to edge service 502 that the packet was received and need not be retransmitted. The acknowledgements may traverse the same or a different path as the packets but are shown as traversing the same provider network merely for the sake of simplicity.

In this example scenario, traffic 801 (including packets and acknowledgements) is exchanged between edge service 502 and one or more of end points 501 via connection 511 and 512 over path 521, although the acknowledgements may optionally take a different path. Similarly, traffic 503 (including packets and acknowledgments) is exchanged between edge service 505 and one or more of end points 501 via connection 515 and 516 over outbound path 525, although the acknowledgements may optionally take a different path. However, in an attempt to send traffic 505 (packets) to one or more of end points 501, a failure 810 blocks the packets from being received. Accordingly, no corresponding acknowledgements reach edge service 502, possibly because none have been sent since the packets were blocked.

Cache server 504, employing reroute process 600, detects the absence of forward progress on both connections, connection 513 and connection 514. Cache server 504 increments their respective failure counters $N_{513}$ and $N_{514}$ to c+1 and x+1 respectively. The incremented failure counters are mixed with the tuple for each respective connection and input into a hash function by access point 507. The hash function calculates a hash value from the mixed input. Cache server 504 then uses the hash value to select a new outbound route for the packet flows associated with the "failed" connections.

FIG. 8B illustrates an exemplary result of the fast reroute. Connection 513 has been rerouted to path 521, while connection 514 has been rerouted to outbound path 525. Traffic 501 now includes both packets and acknowledgements flowing via connection 513, while traffic 503 includes packets and acknowledgements flowing via connection 514. In addition, the failure counters have been incremented and may remain so, at least for a period of time, to promote path diversity with respect to traffic rerouting. It may be appreciated that the acknowledgement messages may traverse different return paths, including traversing a different provider network(s) than the path traveled by the outbound packets, and are shown as traversing the same paths merely for the sake of simplicity.

FIG. 8C illustrates the sequence of operations discussed with respect to FIGS. 8A and 8B with respect to a single end point. In operation, end point 502 sends a content request via provider network 531 and access point 507 to cache server 504. Cache server 504 receives the content request and determines whether the request is a "hit" or a "miss." A hit means that the server has the requested content, whereas a miss means that the server must obtain the content from an origin server 506, another cache server, or elsewhere.

Cache server 504 replies to the content request by sending the content to the end point via access point 507. Cache server 504 sets a firewall marker value on the socket for the connection to zero, which causes cache server 504 look up the route for the packets in table 508. Cache server 504 uses a hash value calculated using a mixed input of the tuple for the connection and the failure counter to look up the route. Accordingly, cache server 504 transmits packets to access point 507 with a label or other such indication that identifies the selected route/provider (e.g. PID-1, for network provider 531).

Access point 507 receives the packets from cache server 504 and sends the packets on the prescribed route addressed to end point 502. End point 502 receives the packets and replies with acknowledgment messages per the connection protocol used to establish a connection between end point 502 and cache server 504. As mentioned, the acknowledgment messages may (or may not) traverse the same path as the packets. However, a failure 510 along the path between cache server 504 and end point 502 may result in lost packets or other conditions that prevent end point 502 from transmitting an ACK to cache server 504 (since end point 502 would have received nothing to acknowledge).

The absence of forward progress on the connection caused by the failures triggers cache server 504 to increment a failure counter encoded in the firewall marker. Cache server 504 continues to send packets to the end point 502, but now with the firewall marker on the connection set to the non-zero value of the failure counter. The non-zero value of the firewall marker triggers cache server 504 to look in table 509 for the appropriate route. Cache server 504 does so again with a hash value calculated based on the failure counter and the tuple for the subject connection. However, since a different table is being used, and because the failure counter has been incremented, it is very likely that cache server 504 picks a route other than the existing path. Accordingly, cache server 504 sends the packets addressed to end point 502 but via the new outbound path, so as to avoid whatever problems along the old route prevented end point 502 from returning ACKs to cache server 504. In this example, cache server 504 affects this by identifying provider network 533 as the new route (e.g. PID-2). As the packets reach end-point 502 successfully, end-point 502 replies with acknowledgments, which may travel a return path that is the same or different than that of the incoming packets.

FIG. 9 illustrates computing system 901 that is representative of any system or collection of systems in which the various processes, programs, services, and scenarios disclosed herein may be implemented. Examples of computing system 901 include, but are not limited to, server computers, routers, web servers, cloud computing platforms, and data center equipment, as well as any other type of physical or virtual server machine, physical or virtual router, container, and any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909 (optional). Processing system 902 is operatively coupled with storage system 903, communication interface system 907, and user interface system 909.

Processing system 902 loads and executes software 905 from storage system 903. Software 905 includes and implements reroute process 906, which is representative of the reroute processes discussed with respect to the preceding Figures. When executed by processing system 902 to provide packet rerouting, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including reroute process 906) may be implemented in program instructions and among other functions may, when executed by processing system 902, direct processing system 902 to operate as described with respect to the various operational scenarios, sequences, and processes illustrated herein. For example, software 905 may include program instructions for implementing a reroute process to reroute packet traffic as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to provide packet rerouting. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a server in an infrastructure service to reroute a packet flow sent from the server to an end point over an outbound path, the method comprising:
   detecting a failure of the outbound path based on at least a measure of forward progress made on a connection between the server and the end point;

in response to the failure, generating a hash value based at least on an identifying value of the connection and a failure counter associated with the measure of forward progress made on the connection;

selecting a next outbound path for the packet flow based on at least the hash value generated in response to the failure; and sending the packet flow over the next outbound path to the end point.

2. The method of claim 1 wherein detecting the failure of the outbound path occurs when the measure of forward progress made on the connection indicates an absence of any forward progress for an amount of time.

3. The method of claim 2 further comprising incrementing the failure counter each time the measure of forward progress made on the connection indicates the absence of any forward progress for the amount of time.

4. The method of claim 1 wherein the outbound path from the server to the end point traverses two or more networks and wherein the next outbound path from the server to the end point traverses at least one network not traversed by the outbound path.

5. The method of claim 1 wherein generating the hash value comprises generating an input to a hash function from at least the identifying value and the failure counter and executing the hash function using the input to produce the hash value.

6. The method of claim 5 wherein generating the input to the hash function comprises mixing the failure counter with a set of identifying values in a tuple associated with the connection, wherein the set of identifying values includes the identifying value.

7. The method of claim 6 wherein the set of identifying values in the tuple comprises a protocol identifier, a source Internet protocol (IP) address, a source port, a target IP address, and a target port.

8. The method of claim 7 wherein sending the packet flow over the next outbound path to the end point comprises sending the packet to a router with the failure counter encoded in a subset of bits of a firewall marker of each packet.

9. The method of claim 8 wherein the connection comprises a transmission control protocol (TCP) connection.

10. A computing apparatus comprising:
one or more computer readable storage media;
a processing system operatively coupled with the one or more computer readable storage media; and
program instructions stored on the one or more computer readable storage media for operating a server in an infrastructure service to reroute a packet flow sent from the server to an end point over an outbound path;
wherein the program instructions, when executed by the processing system, direct the server to at least:
detect a failure of the outbound path based at least on a measure of forward progress made on a connection between the server and the end point;
in response to the failure, generate a hash value based at least on an identifying value of the connection and a failure counter associated with the connection;
select a next outbound path for the packet flow based on the hash value; and
send the packet flow over the next outbound path from the server to the end point.

11. The computing apparatus of claim 10 wherein the program instructions direct the server to detect the failure of the outbound path when the measure of forward progress made on the connection indicates an absence of any forward progress for an amount of time.

12. The computing apparatus of claim 11 wherein the program instructions direct the server to increment the failure counter each time the measure of forward progress made on the connection indicates the absence of any forward progress for the amount of time.

13. The computing apparatus of claim 10 wherein the outbound path from the server to the end point traverses two or more networks and wherein the next outbound path from the server to the end point traverses at least one network not traversed by the outbound path.

14. The computing apparatus of claim 10 wherein to generate the hash value, the program instructions direct the server to generate an input to a hash function from at least the identifying value and the failure counter and execute the hash function using the input to produce the hash value.

15. The computing apparatus of claim 14 wherein to generate the input to the hash function, the program instructions direct the server to substitute the failure counter for at least one of a set of identifying values in a tuple associated with the connection, wherein the set of identifying values includes the identifying value.

16. The computing apparatus of claim 15 wherein the set of identifying values in the tuple comprises a protocol identifier, a source Internet protocol (IP) address, a source port, a target IP address, and a target port.

17. The computing apparatus of claim 16 the program instructions direct the server to encode the failure counter in a subset of bits of a firewall marker of each packet.

18. The computing apparatus of claim 17 wherein the connection comprises a transport layer connection.

19. A system for rerouting packets in a packet flow sent from the server to an end point over an outbound path, the system comprising:
means for detecting a failure of the outbound path based at least on a measure of forward progress made on a connection between the server and the end point;
means for encoding a failure counter associated with the connection in a firewall marker of each of the packets of the packet flow;
means for selecting a routing table from a set of routing tables based on the firewall marker in each of the packets;
means for generating a hash value based at least on identifying values of the connection and the failure counter associated with the connection;
means for selecting a next outbound path for the packet flow based on the hash value; and
means for sending the packet flow over the next outbound path to the end point.

20. The system of claim 19 further comprising:
means for incrementing the failure counter each time the measure of forward progress made on the connection indicates the absence of any forward progress for the amount of time;
wherein detecting the failure of the outbound path occurs when the measure of forward progress made on the connection indicates an absence of any forward progress for an amount of time;
wherein the outbound path from the server to the end point traverses two or more networks and wherein the next outbound path from the server to the end point traverses at least one network not traversed by the outbound path;

wherein the identifying values of the connection, comprise a protocol identifier, a source Internet protocol (IP) address, a source port, and a target IP address; and
wherein the connection comprises a transport layer connection.

\* \* \* \* \*